(12) United States Patent
Ljung

(10) Patent No.: US 9,480,366 B2
(45) Date of Patent: Nov. 1, 2016

(54) LID HOLDING DEVICE

(71) Applicant: Kenneth Ljung, Roseville, MN (US)

(72) Inventor: Kenneth Ljung, Roseville, MN (US)

( * ) Notice: Subject to any disclaimer, the term of this patent is extended or adjusted under 35 U.S.C. 154(b) by 0 days.

(21) Appl. No.: 14/814,045

(22) Filed: Jul. 30, 2015

(65) Prior Publication Data

US 2016/0029852 A1 Feb. 4, 2016

Related U.S. Application Data

(60) Provisional application No. 62/032,682, filed on Aug. 4, 2014.

(51) Int. Cl.
*A47J 47/16* (2006.01)
*A47J 36/06* (2006.01)

(52) U.S. Cl.
CPC ..................................... *A47J 47/16* (2013.01)

(58) Field of Classification Search
CPC .. A47F 7/0042; A47F 7/0057; A47F 7/0064; A47G 25/06; A47G 25/0607; A47G 25/0635; A47G 25/10; A47G 25/52; A47J 36/06; A47J 36/12; A47J 47/16; B60R 7/10; F16M 13/02
USPC .............. 211/31, 41.11, 85.29; 248/215, 304, 248/316.8, 317, 318, 343, 367, 372, 373; D8/367, 372, 373
See application file for complete search history.

(56) References Cited

U.S. PATENT DOCUMENTS

| | | | | |
|---|---|---|---|---|
| 369,786 A * | 9/1887 | Harrison | ................. | A47G 25/10 211/32 |
| 1,566,920 A * | 12/1925 | Pie | ........................ | A47G 25/10 211/31 |
| 2,532,255 A * | 11/1950 | Davis | ................... | A47G 29/083 248/215 |
| 2,606,666 A * | 8/1952 | Gray | ....................... | A47J 47/16 211/113 |
| 2,633,994 A | 4/1953 | Brown | | |
| 2,662,717 A | 12/1953 | Johnson | | |
| 2,692,108 A * | 10/1954 | Neivert | ............... | A47G 29/083 248/215 |
| 2,987,289 A * | 6/1961 | Wamsley | ................ | A47J 47/16 211/116 |
| 3,780,875 A * | 12/1973 | Scholl | ..................... | A47J 47/16 211/115 |
| 4,290,531 A * | 9/1981 | Lazarus, III | ............ | A47J 47/16 211/113 |
| 5,038,945 A | 8/1991 | Melkonian | | |
| 5,094,417 A * | 3/1992 | Creed | ................. | A47G 29/083 248/215 |
| 5,458,301 A * | 10/1995 | Cournoyer | .......... | B65B 67/1227 248/100 |
| 6,003,688 A | 12/1999 | Steidle | | |
| 6,227,387 B1 * | 5/2001 | Rose | ....................... | A47J 47/16 211/113 |
| 6,530,548 B2 * | 3/2003 | Pizzirusso | ............ | A47G 29/083 248/304 |

(Continued)

*Primary Examiner* — Joshua Rodden
(74) *Attorney, Agent, or Firm* — Global Intellectual Property Agency, LLC; Daniel Boudwin

(57) ABSTRACT

A lid holding device for supporting a pot lid off of a countertop while cooking in order to prevent creating a mess thereon. The lid holding device includes a pair of elongated rods, wherein each elongated rod is preferably configured as a J-shape. The elongated rods are parallel to one another and include a first end and a second end. The first ends are angled upwards and able to receive an inverted lid thereon so as to allow a user to avoid having to place the lid on a countertop. The lid holding device further includes a single mount having a pair of channels disposed thereon. The second end of the elongated rods are disposed within the channels in order to maintain a parallel position. The device can be secured to a support surface by inserting a fastener through the support surface and into the upper side of the mount.

7 Claims, 3 Drawing Sheets

(56) References Cited

U.S. PATENT DOCUMENTS

| | | | | |
|---|---|---|---|---|
| D473,451 S * | 4/2003 | Goodman | ............... | D8/367 |
| 7,182,304 B2 * | 2/2007 | Adams | ............... | A47G 29/083 248/205.5 |
| 7,219,868 B2 * | 5/2007 | Marler | ............... | A47G 29/083 16/256 |
| 7,322,554 B2 * | 1/2008 | Caroselli | ............... | A47G 29/083 223/120 |
| 7,389,966 B1 * | 6/2008 | Hunter | ............... | A47G 29/083 248/304 |
| 7,464,911 B1 * | 12/2008 | Yen | ............... | A47G 29/083 248/304 |
| D637,893 S * | 5/2011 | Yon | ............... | D8/370 |
| 8,517,323 B1 * | 8/2013 | Gregory | ............... | A47J 47/16 108/26 |
| 2003/0038220 A1 * | 2/2003 | Catan | ............... | A47G 29/083 248/304 |
| 2004/0195484 A1 * | 10/2004 | Sheeran | ............... | A47G 29/083 248/304 |
| 2014/0346129 A1 * | 11/2014 | Hall | ............... | A47J 47/16 211/162 |

* cited by examiner

LID HOLDING DEVICE

CROSS REFERENCE TO RELATED APPLICATION

This application claims the benefit of U.S. Provisional Application No. 62/032,682 filed on Aug. 4, 2014. The above identified patent application is herein incorporated by reference in its entirety to provide continuity of disclosure.

BACKGROUND OF THE INVENTION

Field of the Invention

The present invention relates to lid holding devices. More specifically, the present invention provides a lid holding device comprising a pair of J-shaped elongated rods disposed substantially parallel to one another. The elongated rods each comprise a first end and a second end, wherein the first ends are adapted to receive a lid thereon. The second ends of the elongated rods are disposed on a mount, wherein the mount is adapted to receive one or more fasteners therein so as to secure the mount to a support surface.

Many individuals rest pot and pan lids on a kitchen countertop when stirring, adding ingredients, seasoning, or tasting food while cooking. However, resting pot and pan lids on a kitchen countertop can stain a countertop and create a mess due to the excess food residue and condensation build-up on the underside of the lid. Furthermore, the countertop can become etched and damaged by resting a hot lid thereon. Some individuals choose to hold the lid in their hand, however, it is inconvenient to cook while holding the lid and dangerous if the lid is hot, which can result in burning oneself. Therefore, there exists a need in the prior art for a device that is capable of supporting a lid so as to avoid having to rest the lid on a countertop or holding the lid in one's hand while cooking.

Devices have been disclosed in the prior art that relate to lid holding devices. These include devices that have been patented and published in patent application publications. These devices generally relate to a lid rack comprising a pair of arms, such as U.S. Pat. No. 6,003,688 and U.S. Pat. No. 2,662,717. Other devices generally relate to a lid rack comprising a C-shaped support, such as U.S. Pat. Nos. 5,038,945, 8,517,323, and U.S. Pat. No. 2,633,994.

These prior art devices have several known drawbacks. The devices in the prior art fail to provide a pair of elongated rods disposed in a J-shaped configuration and secured to a surface by a single mount. Some of the devices are mounted to a vertical surface, thereby taking up wall space. Other devices comprise linear pivoting arms that require additional components necessary to secure the arms to a surface. These devices fail to provide elongated rods, wherein the lid receiving portion is angled upwards so as to allow a lid to remain securely on the device. Additionally, the devices having a C-shaped support are only able to hold a lid having a knob shaped handle therein, whereas the present invention is adapted to support a lid having various shaped handles. Thus, the prior art devices fail to disclose a lid holding device that includes a pair of elongated rods secured to a surface by a single mount and adapted to support various shaped lids thereon.

In light of the devices disclosed in the prior art, it is submitted that the present invention substantially diverges in design elements from the prior art and consequently it is clear that there is a need in the art for an improvement to existing lid holding devices. In this regard the instant invention substantially fulfills these needs.

SUMMARY OF THE INVENTION

In view of the foregoing disadvantages inherent in the known types of lid holding devices now present in the prior art, the present invention provides a new lid holding device wherein the same can be utilized for providing convenience for the user when supporting a lid removed from a pot, pan, or the like while cooking.

It is therefore an object of the present invention to provide a new and improved lid holding device that has all of the advantages of the prior art and none of the disadvantages.

It is another object of the present invention to provide a lid holding device comprising a pair of J-shaped elongated rods disposed parallel to one another and each having a first end and a second end.

Another object of the present invention is to provide a lid holding device wherein the first ends of the elongated rods are angled upwards and adapted to receive a lid thereon.

Yet another object of the present invention is to provide a lid holding device further comprising a mount having a pair of channels disposed on an upper side thereof, wherein the second ends of the elongated rods are frictionally secured thereto.

Yet another object of the present invention is to provide a lid holding device wherein the upper side of the mount comprises one or more apertures adapted to receive a fastener therethrough so as to allow the mount to be secured to a support surface, such that the fastener is prevented from coming loose and falling onto the lid.

Another object of the present invention is to provide a lid holding device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
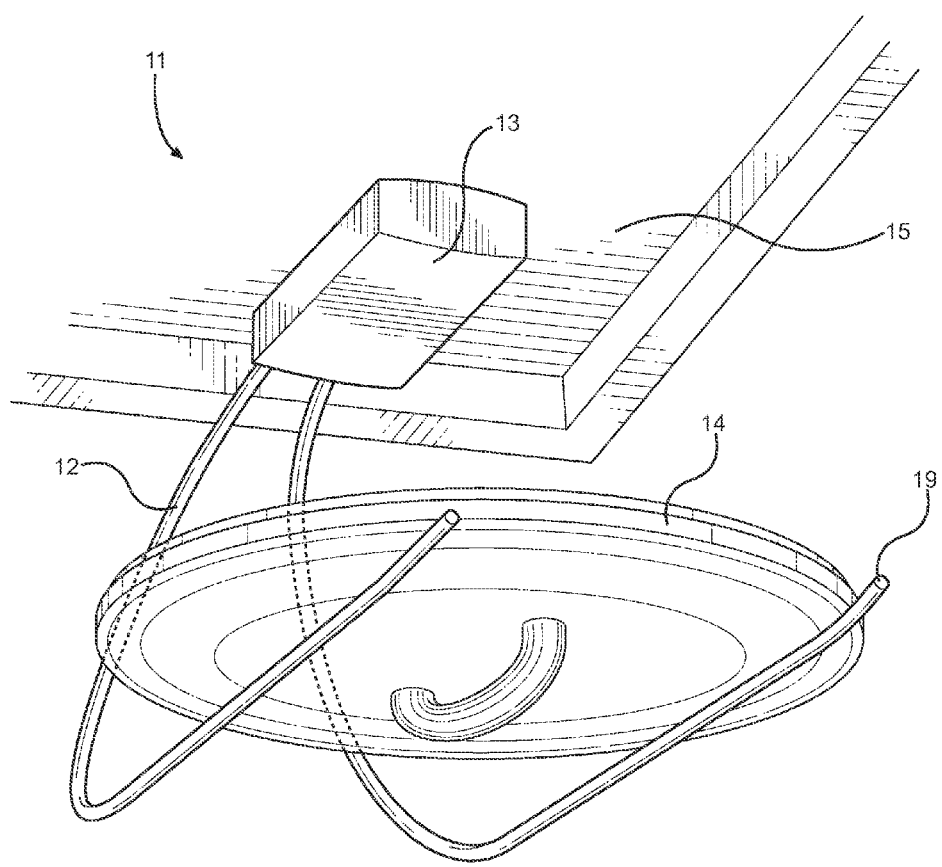
FIG. 1 shows a perspective view of an embodiment of the lid holding device wherein a lid is positioned thereon.

Reference is made herein to the attached drawings. Like reference numerals are used throughout the drawings to depict like or similar elements of the lid holding device. For the purposes of presenting a brief and clear description of the present invention, the preferred embodiment will be discussed as used for supporting a lid having been removed from a pot, pan, or the like while cooking. The figures are intended for representative purposes only and should not be considered to be limiting in any respect.

Referring now to FIG. 1, there is shown a perspective view of an embodiment of the lid holding device wherein a lid is position thereon. The lid holding device 11 includes a pair of elongated rods 12, wherein the rods 12 extend downwardly from a mount 13 and include a horizontal portion on which a pot lid 14 can rest. The rods 12 extend downwardly from the mount 13 so that there is space between the support surface 15 and the horizontal portion of the rods 12. If the elongated rods 12 extended horizontally from the mount 13, there would be no space to position the pot lid 14 on the rods 12. In the illustrated embodiment, the elongated rods 12 comprise a J-shaped configuration and include a first end 19 and a second end. The elongated rods 12 comprise a circular cross section, however, in alternate embodiments, the cross section can be any suitable shape, including a square shape.

The first ends 19 of the elongated rods 12 are adapted to receive an inverted lid 14 thereon. The elongated rods 12 are separated by a space so that the weight of the lid 14 can be distributed evenly on the rods 12 and so as to allow the lid 14 to rest stably on the rods 12. Preferably, the first ends 19 are angled upwards so as to prevent a lid 14 from slipping off of the device 11. In other embodiments, the first ends 19 can comprise any suitable mechanism to prevent a lid 14 from slipping therefrom, such as a protrusion that provides an obstacle for the lid 14 to abut.

The J-shape of the elongated rods 12 enables a lid 14 to rest on one end thereof while the opposing second end is able to secure to a mount 13 and the mount 13 is able to secure to a support surface 15, thereby supporting the lid 14 off of a countertop. When the lid 14 is removed from a pot, pan, or the like and is then inverted, any food or condensation on the lid 14 remains thereon and is prevented from contacting a countertop. Resting the lid 14 on the device 11 further prevents a countertop from becoming etched or burned from a lid 14 that has been heated via resting on a pot while cooking. The elongated rods 12 are composed of a rigid material that will not bend or deform under the weight of the lid 14. The rods 12 should also be composed of a corrosion-resistant material so that the rods 12 do not degrade upon repeated exposure to moisture.

Figure 2:
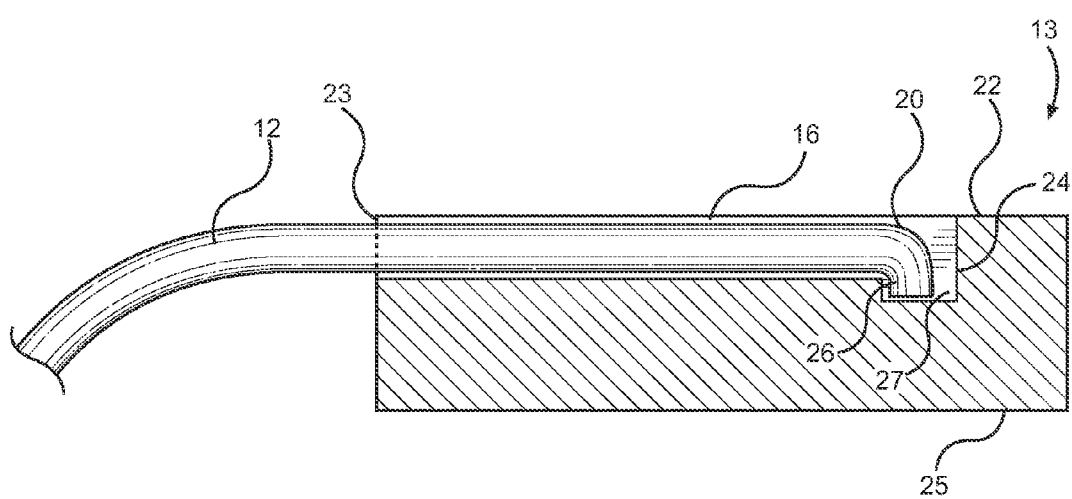
FIG. 2 shows a cross sectional view of the mount and the second end of an elongated rod of the lid holding device.

Referring now to FIG. 2, there is shown a cross sectional view of the mount and the second end of an elongated rod of the lid holding device. The lid holding device further comprises a mount 13 having an upper side 22 and a lower side 25. The mount 13 is adapted to receive and secure the elongated rods 12 to a support surface. Preferably, the mount 13 comprises a pair of channels 16 disposed on the surface of the upper side 22 thereof, wherein the second ends 20 of the elongated rods 12 are secured thereto. Each channel comprises a first end 23 and a second end 24. The first end 23 of the channel 16 is open so as to receive the rod 12 therethrough. The second end 24 of the channel 16 is closed in order to prevent the rod 12 from passing through the mount 13.

In some embodiments, the second ends 20 of the elongated rods 12 comprise a curved end 26 disposed at a downward angle, such as a 90 degree angle, for example. The curved end 26 is positioned in a recessed area 27 disposed on the second end 24 of the channel 16. The dimension of the recessed area 27 and the curved end 26 are substantially the same size and shape in order for the curved end 26 to fit securely therein. Thus, the elongated rod 12 is prevented from becoming pulled out of the mount 13. In other embodiments, a fastener, such as adhesive, is used to secure the second end 20 of elongated rods 12 to the channel 16, rather than the second end 20 thereof comprising a curved end 26.

Furthermore, in the illustrated embodiment, the curved ends 26 of the elongated rods 12 are angled laterally from the plane of the horizontal first ends of the rods 12. The lateral angle is adapted to allow the space between the rods 12 to increase as the rods 12 extend downward from the channels 16, such that the space between the first ends of the rods 12 is greater than the space between the second ends 20 of the rods 12. Thus, the separation of the first ends of the rods 12 provides a stable surface in order to rest a lid thereon. However, in alternate embodiments, the channels 16 are angled in order to provide the desired distance between the first ends of the elongated rods 12.

Figure 3:
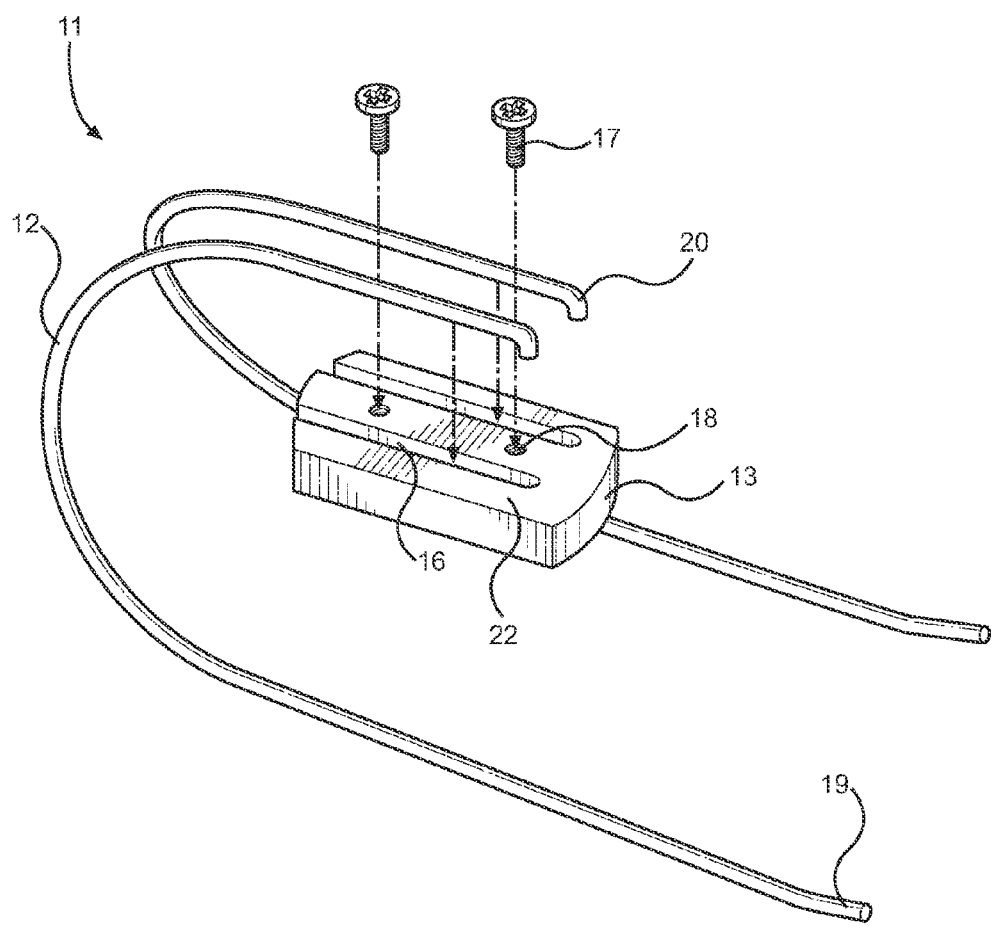
FIG. 3 shows an exploded view of an embodiment of the lid holding device.

Referring now to FIG. 3, there is shown an exploded view of an embodiment of the lid holding device. The width of the channels 16 is substantially the same as the width of the elongated rods 12 so as to allow the rods 12 to frictionally and securely fit therein. In the illustrated embodiment, each channel 16 is rounded in order to receive a rod 12 having a circular shaped cross section therein. The depth of the channel 16 is adapted to allow an upper end of the elongated rod 12 to align with the surface of the upper side 22 in order to allow the surface of the mount 13 to rest flush against a support surface. However, the channels 16 can comprise any suitable configuration as long as the rods 12 can frictionally fit therein. In some embodiments, the channels 16 are disposed within the mount 13, rather than on a surface thereof. In this way, linear second ends 20 of the elongated rods 12 are able to be inserted into the mount 13 rather than positioned thereon.

The upper side 22 of the mount 13 further comprises one or more apertures 18 adapted to receive a fastener 17 therein in order to secure the mount 13 to a horizontal support surface. The apertures 18 do not extend through the lower side of the mount 13 in order to prevent the fasteners 17 from having the capability to be positioned through the lower side of the mount 13 and into a support surface. In this way, the fasteners 17 are prevented from coming loose and falling onto the lid.

In operation, the second ends 20 of the elongated rods 12 are disposed within the channels 16 of the mount 13. The surface of the upper side 22 is positioned flush against a support surface, wherein fasteners 17 are disposed through the horizontal support surface and into the apertures 18 so as to secure the mount 13 and the elongated rods 12 thereto. When a user is cooking, a lid from a pot can be removed therefrom and placed in an inverted orientation on the first ends 19 of the elongated rods 12. In some embodiments, the components of the device 11, including the pair of elongated rods 12 and the mount 13, are separable from one another so as to allow the device 11 to be stored in a compact configuration.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lid holding device, comprising:
   a pair of J-shaped elongated rods each having a first end and a second end, wherein said first end of said pair of elongated rods are horizontally disposed and comprise a space therebetween in order to receive an inverted lid thereon;
   a mount having an upper side and a lower side, wherein said mount is secured to said second end of each of said pair of elongated rods;
   a pair of channels disposed on said upper side of said mount, wherein an upper end of each of said pair of channels is exposed and configured to receive respective ones of said second end of the pair of elongated rods therethrough;
   wherein said mount comprises one or more apertures adapted to receive a fastener therein in order to secure said mount to a horizontal support surface;
   wherein said one or more apertures are disposed on said upper side of said mount;
   wherein said one or more apertures comprises an open upper end disposed on said upper side of said mount and an opposing closed lower end.

2. The lid holding device of claim 1, wherein said first end of each of said pair of elongated rods are angled upwards.

3. The lid holding device of claim 1, wherein said upper side of said mount comprises a pair of recessed areas adapted to receive respective ones of said second end of each of said pair of elongated rods therein.

4. The lid holding device of claim 3, wherein said second end of each of said pair of elongated rods comprise a curved end disposed at a downwards angle and adapted to fit within said pair of recessed areas disposed on said mount.

5. The lid holding device of claim 4, wherein said curved end is angled laterally from a plane of said first end of said pair of elongated rods, such that said space between said first end of said pair of elongated rods is wider than a space between said second end of said pair of elongated rods in order for said inverted lid to remain stably on said first end of said pair of elongated rods.

6. The lid holding device of claim 1, wherein each of said pair of channels comprise a recessed area adapted to receive said second end of said pair of elongated rods therein.

7. The lid holding device of claim 1, wherein said pair of channels are parallel to one another.

* * * * *